(12) United States Patent
Suga et al.

(10) Patent No.: US 7,776,423 B2
(45) Date of Patent: Aug. 17, 2010

(54) DECORATING SHEET, DECORATED MOLDED PRODUCT, AND IN-INJECTION-MOLD DECORATING METHOD

(75) Inventors: Kazuhiro Suga, Tokyo-To (JP); Yoshiyuki Meiki, Tokyo-To (JP); Hiroyuki Atake, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1107 days.

(21) Appl. No.: 10/573,409

(22) PCT Filed: Jul. 2, 2004

(86) PCT No.: PCT/JP2004/009426

§ 371 (c)(1), (2), (4) Date: Jun. 5, 2006

(87) PCT Pub. No.: WO2005/030481

PCT Pub. Date: Apr. 7, 2005

(65) Prior Publication Data

US 2007/0026197 A1   Feb. 1, 2007

(30) Foreign Application Priority Data

Sep. 29, 2003   (JP) .............................. 2003-337086

(51) Int. Cl.
*B32B 3/00* (2006.01)
*B29C 45/14* (2006.01)

(52) U.S. Cl. ...................... 428/162; 428/161; 156/245; 264/241; 264/259; 264/319; 264/320; 264/328.1; 264/571

(58) Field of Classification Search .......... 428/161–162
See application file for complete search history.

(56) References Cited

U.S. PATENT DOCUMENTS 3,811,915 A  *  5/1974  Burrell et al. ............... 428/143

(Continued)

FOREIGN PATENT DOCUMENTS

EP      1 053 850 A1     11/2000

(Continued)

OTHER PUBLICATIONS

Machine Translation of JP07-009650 (Feb. 1995), obtained from dossier1.ipdl.inpit.go.jp/AIPN/odse_top_fwi.ipdl?N0000=7401 on Jun. 29, 2009.*

(Continued)

*Primary Examiner*—David R Sample
*Assistant Examiner*—Nathan E Comstock
(74) *Attorney, Agent, or Firm*—Oliff & Berridge, PLC (57) ABSTRACT

A decorating sheet comprises a transparent resin substrate sheet 1 and a glossy layer 2 laminated to the back surface of the transparent resin substrate sheet 1, and the front surface of the transparent resin substrate sheet 1 is divided into high-gloss portions H and low-gloss portions L. The transparent resin substrate sheet 1 is thick at the high-gloss portions and thin at the low-gloss portions, and, owing to these portions, the decorating sheet can provide a pattern that is visually sensed as if it were a three-dimensional pattern. This transparent resin substrate sheet 1 is composed of two layers, a crystalline resin layer 11 and a non-crystalline resin layer 12. A decorated molded product Pd can be obtained by laminating this decorating sheet to a resin molded product 5.

11 Claims, 4 Drawing Sheets

U.S. PATENT DOCUMENTS

| | | | | |
|---|---|---|---|---|
| 4,298,646 | A | * | 11/1981 | Haemer et al. ............... 428/159 |
| 4,530,856 | A | * | 7/1985 | Kauffman et al. ........... 427/197 |
| 6,984,440 | B2 | * | 1/2006 | Saito et al. ............... 428/195.1 |
| 2003/0072919 | A1 | * | 4/2003 | Watts et al. ................. 428/159 |

FOREIGN PATENT DOCUMENTS

| | | |
|---|---|---|
| JP | 43-27488 | 11/1968 |
| JP | A 50-19132 | 2/1975 |
| JP | A-52-125602 | 10/1977 |
| JP | A-56-078975 | 6/1981 |
| JP | A 56-87318 | 7/1981 |
| JP | A 57-22755 | 2/1982 |
| JP | U-58-163240 | 10/1983 |
| JP | A 63-50066 | 3/1988 |
| JP | A-01-166958 | 6/1989 |
| JP | A-02-150344 | 6/1990 |
| JP | A-03-224730 | 10/1991 |
| JP | A-04-135853 | 5/1992 |
| JP | A-05-092538 | 4/1993 |
| JP | A-07-009650 | 1/1995 |
| JP | A 7-32476 | 2/1995 |
| JP | A-07-137221 | 5/1995 |
| JP | A-07-207828 | 8/1995 |
| JP | A-07-314630 | 12/1995 |
| JP | 2001047582 A * | 2/2001 |
| JP | 2004042351 A * | 2/2004 |

OTHER PUBLICATIONS

Machine Translation of JP2001-047582 (Feb. 2001), obtained from from dossier1.ipdl.inpit.go.jp/AIPN/odse_top_fwi.ipdl?N0000=7401 on Jun. 29, 2009.*

Development of PBT resin to film applications (no date), obtained from www.polyplastics.com/en/product/lines/extrusion/pbt_film.pdf on Jul. 2, 2009.*

Eastman Eastar 6763 PETG Copolyester (no date), obtained from http://www.matweb.com/search/datasheet.aspx?matguid=4f94ed265e2e4a5b8edfbf3d82a778b3&ckck=1 on Jul. 2, 2009.*

Machine Translation of JP2004-042351 (Feb. 2004), obtained from from dossier1.ipdl.inpit.go.jp/AIPN/odse_top_fwi.ipdl?N0000=7401 on Jul. 4, 2009.*

Dec. 8, 2009 Supplementary European Search Report for European Patent Application No. 04746895.4.

* cited by examiner

DECORATING SHEET, DECORATED MOLDED PRODUCT, AND IN-INJECTION-MOLD DECORATING METHOD

BACKGROUND OF THE INVENTION

1. Field of the Invention

The present invention relates to a decorating sheet having a pattern that gives a visually three-dimensional sensation, to a decorated molded product using the decorating sheet, and to an in-injection-mold decorating method for producing a decorated molded product.

2. Background Art

Decorated molded products obtained by integrating decorating sheets into the surfaces of resin molded products, adherends, are used in a variety of applications. A typical method for producing such a decorated molded product is in-injection-mold decorating that the molding of a resin into a molded product and the lamination of a decorating sheet to the resin molded product are simultaneously conducted (see the following Patent Documents 1 to 6).

In in-injection-mold decorating, the following methods (1) to (4), for example, have been employed to form, on a molded product, a three-dimensional pattern such as a pattern of the grain and vessels of wood so that the surface of the decorated molded product gives a three-dimensional sensation.

(1) A three-dimensional pattern to be embossed has been engraved, in advance, on the cavity wall of an injection mold in order to obtain a decorated molded product (a decorating sheet) having, on its surface, the three-dimensional pattern.

(2) A decorating sheet obtained by using, for its substrate sheet, a sheet of a thermoplastic resin such as an acrylic resin, and embossing a three-dimensional pattern on the substrate sheet with heat and pressure applied is employed.

(3) A printing method such as screen printing method is employed to form a three-dimensional pattern.

(4) A decorating sheet having a three-dimensional pattern is firstly prepared by raise-printing method, using ink made from a curable resin such as an ultraviolet-curing resin. Specifically, for example, at least the recesses in an intaglio roll (also referred to as a shaping plate, a plate cylinder, etc.) are filled with an ionizing-radiation-curing resin ink, and a resin sheet is brought into contact with this ink. The ink, retained between the resin sheet and the intaglio roll, is hardened by ionizing radiation, and the resin sheet is then removed from the intaglio roll. There is thus obtained the resin sheet with the hardened ink in a three-dimensional pattern (see Patent Documents 3, 4, 5, and 6, etc.).

Patent Document 1: Japanese Patent Publication No. 19132/1975.

Patent Document 2: Japanese Patent Publication No. 27488/1968.

Patent Document 3: Japanese Laid-Open Patent Publication No. 87318/1982;

Patent Document 4: Japanese Patent Publication No. 22755/1982.

Patent Document 5: Japanese Patent Publication No. 50066/1988.

Patent Document 6: Japanese Laid-Open Patent Publication No. 32476/1995.

However, the above-described methods (1) to (4) have had the following drawbacks. The method (1) that, while conducting injection molding, a molded product is embossed in an injection mold is disadvantageous in that the face that can be embossed is limited only to the surface of the molded product. It is, therefore, impossible to form a three-dimensional pattern in the inner side of the molded product. Moreover, to previously engrave, on the cavity wall of the injection mold, a three-dimensional pattern to be embossed is essential, so that it is necessary to replace the whole injection mold, which is expensive, when the design of the pattern to be embossed is changed, even if the shape of the molded product itself is not changed. Therefore, it has not been easy to change the pattern to be embossed.

The method (2) that a thermoplastic resin sheet is used for the substrate sheet of a decorating sheet has been disadvantageous in that, when the decorating sheet is preformed in the vacuum forming step prior to the injection molding step in order to make it fit to decorate the solid faces of a molded product, the three-dimensional pattern embossed on the decorating sheet is flattened due to the heat that is used to preform the decorating sheet.

The method (3) in which a three-dimensional pattern is formed by a printing method such as screen printing method has been disadvantageous in that, since the amount of ink that is transferred is limited and small, the printed pattern is not so three-dimensional as an embossed pattern.

The method (4) that raise-printing is conducted by using an ultraviolet-curing resin or the like and an intaglio roll or the like can provide a pattern that is more three-dimensional than a pattern obtained by the above-described printing method (3). However, since ultraviolet light is usually applied from the resin sheet side in order to harden the resin in a three-dimensional pattern, a three-dimensional pattern cannot be obtained unless a transparent sheet is used for the resin sheet. Further, in the case where the decorating sheet is provided with a decorative layer by a conventional printing method, if a three-dimensional pattern is formed before conducting printing for forming the decorative layer, empty spaces tend to occur in the printed decorative pattern because of the three-dimensional pattern.

SUMMARY OF THE INVENTION

An object of the present invention is to provide a decorating sheet having a pattern that gives a visually three-dimensional sensation. Another object of the present invention is to provide a decorating sheet that continuously gives a three-dimensional sensation that is created by a pattern expressed by protrusions and depressions embossed on the surface and inner face of the decorating sheet, even if the decorating sheet is thermoformed by vacuum forming or the like. A further object of the present invention is to provide a decorated molded product using the decorating sheet. A still further object of the present invention is to provide an in-injection-mold decorating method by which the decorated molded product can be produced with ease, and that makes the pattern on the decorating sheet continuously give a visually three-dimensional sensation even after the preforming of the decorating sheet by vacuum forming, or injection molding.

The present invention is a decorating sheet comprising a transparent resin substrate sheet and a glossy layer formed on the back surface of the transparent resin substrate sheet, the front surface of the transparent resin substrate sheet being divided into high-gloss portions with relatively high gloss and low-gloss portions with relatively low gloss, the thickness of the transparent resin substrate sheet being relatively great at the high-gloss portions and relatively small at the low-gloss portions so that the decorating sheet provides a pattern that is visually sensed as if it were a three-dimensional pattern with protrusions and depressions that correspond to the thickness of the transparent resin substrate sheet on the high-gloss portions and that on the low-gloss portions.

When the construction of the decorating sheet is so made, the pattern can visually give a three-dimensional sensation owing to the high-gloss portions and the low-gloss portions of the surface of the decorating sheet, and also to the protrusions/depressions existing in the sheet, in the positions corresponding to the high-gloss portions and the low-gloss portions.

The present invention is the decorating sheet further comprising, a decorative layer that does not fully opacify the glossy layer between the transparent resin substrate sheet and the glossy layer.

By so making the construction, it is possible to obtain a decorating sheet having a pattern of a more elaborate design.

The present invention is the decorating sheet further comprising, a backing sheet made from a thermoplastic resin provided on the back surface of the glossy layer.

By so making the construction of the decorating sheet, if the total thickness of a decorating sheet having no backing sheet is not enough for the intended use, moldability, design, and so forth, it is possible to make up for the insufficiency of the total thickness by the backing sheet. Further, when the layer present on the back surface side of the decorating sheet is poor in adhesion to an adherend, such as a resin molded product, to which the decorating sheet is laminated, it is possible to improve the adhesion by making the backing sheet from a resin that shows high adhesion to the adherend such as a resin molded product.

The present invention is the decorating sheet in which the back surface of the transparent resin substrate sheet has protrusions protruding toward the back surface side, in the positions corresponding to the high-gloss portions.

This is an example of the specific construction useful for making the thickness of the transparent resin substrate sheet greater at the high-gloss portions than at the low-gloss portions.

The present invention is the decorating sheet in which the transparent resin substrate sheet is composed of a first transparent resin substrate sheet on the front surface side and a second transparent resin substrate sheet on the back surface side, the first transparent resin substrate sheet is made from a crystalline resin, the second transparent resin substrate sheet is made from a non-crystalline resin, and the melting point of the first transparent resin substrate sheet is higher than the softening point of the second transparent resin substrate sheet.

When the construction of the decorating sheet is so made, the high-gloss portions or the low-gloss portions that have been provided by making or not making fine irregularities on the front surface of the decorating sheet do not disappear even when the decorating sheet is thermoformed in the course of in-injection-mold decorating or the like, and, moreover, the decorating sheet can show the required moldability (form-follow-up properties). Namely, in the case where the transparent resin substrate sheet is shaped to have the irregularities including the fine irregularities by embossing, if this embossing is conducted at a temperature equal to or higher than the melting point of the first transparent resin substrate sheet, and the thermoforming, such as vacuum forming, of the decorating sheet is conducted at a temperature lower than the melting point of the first transparent resin substrate sheet and equal to or higher than the softening point of the second transparent resin substrate sheet, it is possible to reconcile the retention of the irregularities with the moldability. Consequently, in in-injection-mold decorating, the pattern that is visually sensed as if it were a three-dimensional pattern due to the presence of the irregularities can continue giving a three-dimensional sensation after the step of vacuum forming the decorating sheet, or even after the injection molding step.

The present invention is a decorated molded product comprising a decorating sheet and a resin molded product produced on the back surface of the decorating sheet, the decorating sheet comprising a transparent resin substrate sheet and a glossy layer formed on the back surface of the transparent resin substrate sheet, the front surface of the transparent resin substrate sheet being divided into high-gloss portions with relatively high gloss and low-gloss portions with relatively low gloss, the thickness of the transparent resin substrate sheet being relatively great at the high-gloss portions and relatively small at the low-gloss portions so that the decorating sheet provides a pattern that is visually sensed as if it were a three-dimensional pattern with protrusions and depressions that correspond to the thickness of the transparent resin substrate sheet on the high-gloss portions and that on the low-gloss portions.

The present invention is the decorated molded product in which the back surface of the transparent resin substrate sheet has protrusions in the positions corresponding to the high-gloss portions of the surface of the transparent resin substrate sheet, and the high-gloss portions are flat.

This is an example of the specific construction useful for making the thickness of the transparent resin substrate sheet of the decorating sheet greater at the high-gloss portions than at the low-gloss portions. In this construction, the front surface of the high-gloss portions are flat, and the pattern visually gives a three-dimensional sensation.

The present invention is the decorated molded product in which the back surface of the transparent resin substrate sheet has protrusions in the positions corresponding to the high-gloss portions of the surface of the transparent resin substrate sheet, and the high-gloss portions are convex.

This is also an example of the specific construction useful for making the thickness of the transparent resin substrate sheet of the decorating sheet greater at the high-gloss portions than at the low-gloss portions. In this construction, the pattern gives visually a three-dimensional sensation owing to the shape of the surfaces of the high-gloss portions and to the pseudo-three-dimensional sensation produced by the visual effect.

The present invention is an in-injection-mold decorating method for producing a decorated molded product, in which when a resin is molded into a molded product, a decorating sheet is integrally laminated to the surface of the molded product, comprising the sheet-making step (A) in which a laminate of a transparent resin substrate sheet and a glossy layer is heated and embossed so that the transparent resin substrate sheet has, high-gloss portions with relatively high gloss and low-gloss portions with relatively low gloss on the front surface, and that the transparent resin substrate sheet is relatively thick at the high-gloss portions and relatively thin at the low-gloss portions, thereby making a decorating sheet; the vacuum forming step (B) in which the decorating sheet is softened by heating and is vacuum-formed into the desired shape that corresponds to the shape of a decorated molded product to be finally produced; and the injection molding step (C) in which the vacuum-formed decorating sheet is placed in an injection mold, with the front surface side of the decorating sheet facing to the inner face of the injection mold, and a resin is poured into this injection mold and is then hardened, thereby molding the resin into a resin molded product, and, at the same time, integrally laminating the decorating sheet to the surface of the resin molded product.

When the construction of the decorating method is so made, the in-injection-mold decorating method and also the decorated molded product obtained by this method can enjoy the effect of the decorating sheet that the pattern gives visually a three-dimensional sensation.

The present invention is the in-injection-mold decorating method in which the transparent resin substrate sheet in the laminate has a first transparent resin substrate sheet on the front surface side and a second transparent resin substrate sheet on the back surface side, the first transparent resin substrate sheet is made from a crystalline resin, the second transparent resin substrate sheet is made from a non-crystalline resin, and the melting point of the first transparent resin substrate sheet is higher than the softening point of the second transparent resin substrate sheet.

The present invention is the in-injection-mold decorating method in which, in the sheet-making step, embossing is conducted at a temperature equal to or higher than the melting point of the first transparent resin substrate sheet.

The present invention is the in-injection-mold decorating method in which, in the vacuum-forming step, vacuum forming is conducted at a temperature equal to or higher than the softening point of the second transparent resin substrate sheet and lower than the melting point of the first transparent resin substrate sheet.

When the construction of the decorating method is so made, since the transparent resin substrate sheet is composed of a laminate of two specified layers, the in-injection-mold decorating method (and the decorated molded product obtained by this method) can surely enjoy the effect that the pattern gives visually a three-dimensional sensation. Therefore, the pattern on the decorating sheet continues giving visually a three-dimensional sensation after the vacuum forming step and even after the injection molding step.

According to the decorating sheet of the present invention, even when the sheet has a flat surface, a pattern on the sheet is visually sensed as if it were a three-dimensional pattern. If a decorative layer is formed between the transparent resin substrate sheet and the glossy layer, the decorating sheet can provide a pattern of a more elaborate design. Further, if a backing layer is formed on the back surface of the glossy layer, the decorating sheet can have a satisfactorily great total thickness, improved adhesion to an adherend such as a resin molded product, and so forth. Furthermore, if the transparent resin substrate sheet is shaped to have protrusions protruding toward the back surface side on its back surface in the positions corresponding to the high-gloss portions of the surface of the transparent resin substrate sheet, the thickness of the sheet becomes greater at these portions than at the other portions. Therefore, even if the high-gloss portions are flat, the decorating sheet can provide a pattern that gives visually a three-dimensional sensation.

The decorated molded product of the present invention can provide a pattern that gives a three-dimensional sensation and is visually sensed as if it were a three-dimensional pattern.

According to the in-injection-mold decorating method of the present invention, there can be obtained a decorated molded product having a pattern that is visually sensed as if it were a three-dimensional pattern. If a laminate of two specified layers is used for the transparent resin substrate sheet of the decorating sheet for use in this method, the pattern on the decorating sheet continues giving visually a three-dimensional sensation.

BRIEF DESCRIPTION OF THE DRAWINGS

FIG. 4B is an enlarged view of part B of FIG. 4A, FIGS. 5A and 5B are sectional views explaining a method for shaping a transparent resin substrate sheet so that the surface of the transparent resin substrate sheet has high-/low-gloss portions and that the back surface of the transparent resin substrate sheet has protrusions in the positions corresponding to the high-gloss portions.

BEST MODE FOR CARRYING OUT THE INVENTION

The best mode for carrying out the present invention will be described hereinafter with reference to the accompanying drawings.

Figure 1A:
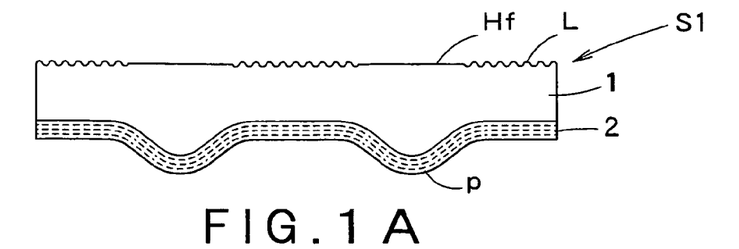
FIGS. 1A to 1C are sectional views illustrating some forms of decorating sheets according to the present invention.
Figure 1B:
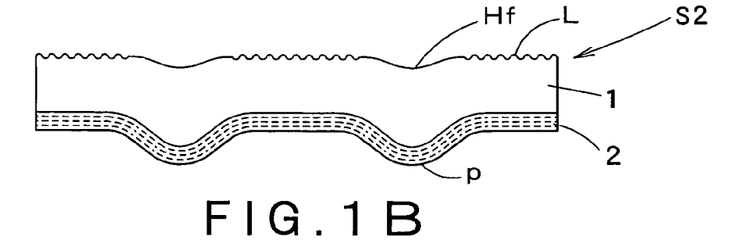
Figure 1C:
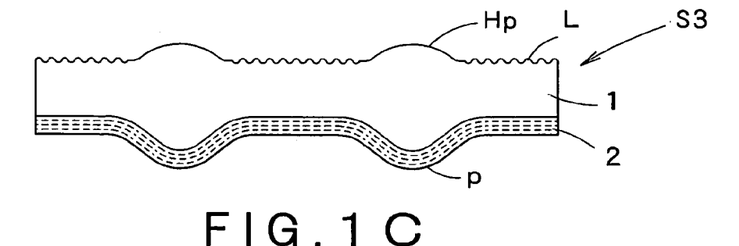

Outline:

FIG. 1 includes sectional views illustrating three examples of the basic construction of a decorating sheet S of the present invention. Decorating sheets in various forms such as decorating sheets S1, S2 and S3, and a decorating sheet Sn (n is an integer), for example, a decorating sheet S4, are herein sometimes collectively referred to simply as a decorating sheet S.

A decorating sheet S1 shown in FIG. 1A comprises a transparent resin substrate sheet 1 and a glossy layer 2 formed on the back surface of the transparent resin substrate sheet 1. The front surface (surface) of the transparent resin substrate sheet 1 is divided into low-gloss portions L having low gloss (for example, matted) as compared with their surroundings, and high-gloss portions H (Hf) having high gloss (for example, glossy) as compared with their surroundings. In FIG. 1A, the surfaces of the high-gloss portions H are flat, and these portions are herein referred to as high-gloss portions Hf. Further, the thickness of the transparent resin substrate sheet 1 is greater at the high-gloss portions Hf and smaller at the low-gloss portions L. Moreover, the back surface of the transparent resin substrate sheet 1 is protrudent in the positions corresponding to the high-gloss portions Hf to form protrusions p protruding toward the back surface side. The surface of the transparent resin substrate sheet 1 is flat at the low-gloss portions L.

As for the form of the high-gloss portions H, there are three types, as shown in FIGS. 1A to 1C, sectional views. Namely, the three types include the type that the surfaces are flat (high-gloss portions Hf) as mentioned already with reference to FIG. 1A, the type that the surfaces form recesses (high-gloss portions Hr), and the type that the surfaces are protrudent (high-gloss portions Hp). In the present invention, these high-gloss portions Hf, Hr, and Hp are sometimes collectively referred to simply as high-gloss portions H.

In this specification, the "front surface side (surface side)" means the side on which the transparent resin substrate sheet 1 of the decorating sheet S is situated (the viewer side of the decorating sheet). The upper side in FIGS. 1A to 1C is the front surface side. On the other hand, the "back surface side"

means the side on which the glossy layer 2 of the decorating sheet S is situated (the side opposite to the viewer side of the decorating sheet, which is also the adherend side). The lower side in FIGS. 1A to 1C is the back surface side.

Figure 2:
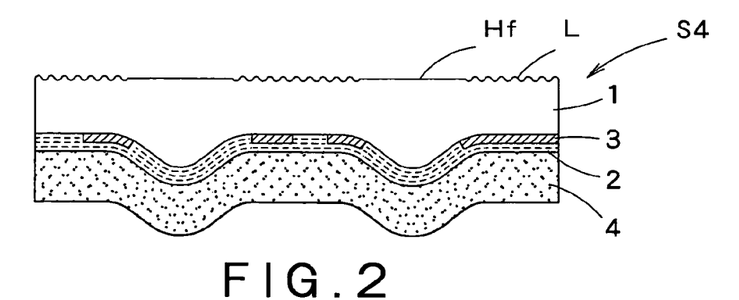
FIG. 2 is a sectional view illustrating another form of a decorating sheet according to the present invention.

The decorating sheet of the present invention may optionally contain a decorative layer 3 between the transparent resin substrate sheet 1 and the glossy layer 2, or a backing layer 4 on the back surface of the glossy layer 2, as shown in FIG. 2. Although not shown in the figure, an adhesive layer for providing adhesion properties useful for laminating the decorating sheet to an adherend may also be optionally formed on the outermost back surface of the decorating sheet. Basically, the decorative layer 3, the backing sheet 4, and the adhesive layer are optional layers, and only one of or two of these layers may be formed.

Figure 4A:
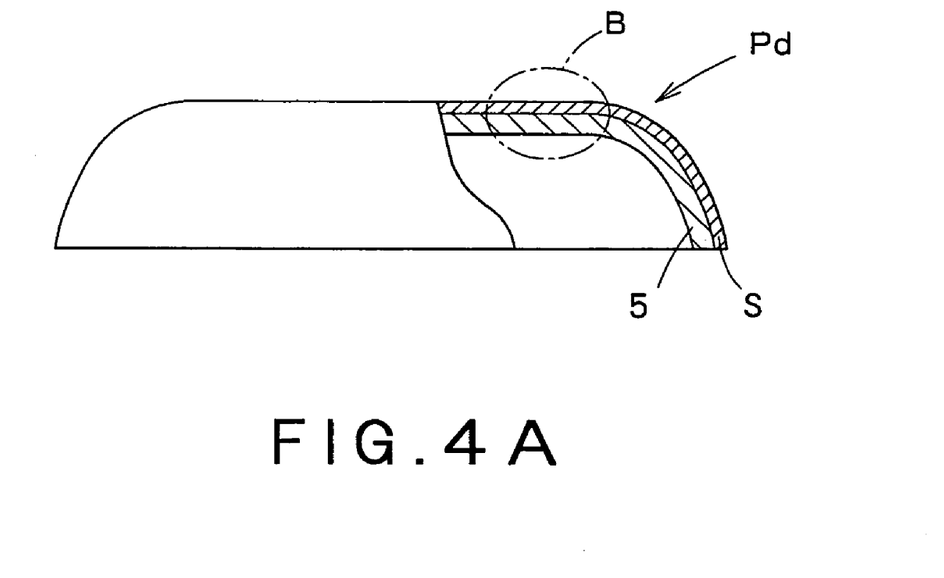
FIG. 4A is a sectional view illustrating a form of a decorated molded product of the present invention.
Figure 4B:
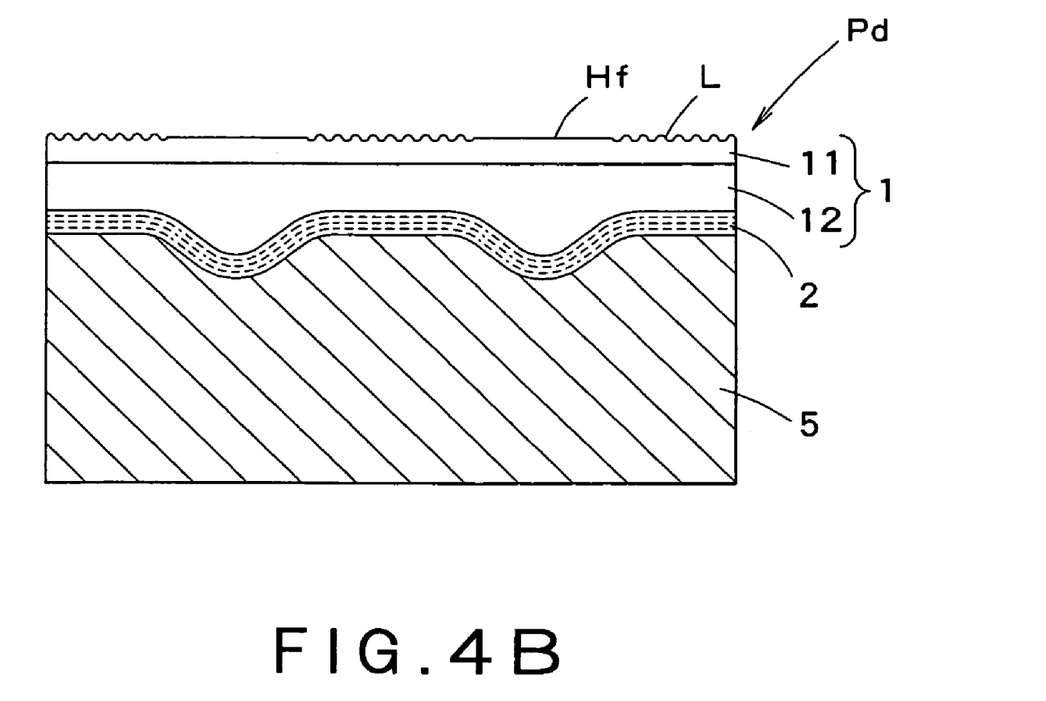

If the above-described decorating sheet S is laminated to the surface of a resin molded product 5 by one of various laminating methods, for example, by an in-injection-mold decorating method, there can be obtained a decorated molded product Pd of the present invention (FIGS. 4A and 4B).

An in-injection-mold decorating method of the present invention is preferred for the above-described laminating. In the in-injection-mold decorating method of the invention, it is preferable to employ a decorating sheet whose transparent resin substrate sheet is a laminate of two specified layers. This is because such a laminate ensures that the pattern embossed on the decorating sheet can be imparted to the molded product without being flattened in the vacuum forming step or even in the injection molding step so that the molded product visually gives a three-dimensional sensation. In this case, in order to fulfill, at the same time, the two requirements, the secured formation of the embossed pattern and the moldability of the decorating sheet, it is more preferable to emboss the sheet to be made into the decorating sheet at a temperature equal to or higher than the melting point of the first transparent resin substrate sheet, and to effect the vacuum forming step in the in-injection-mold decorating method at a temperature equal to or higher than the softening point of the second transparent resin substrate sheet and lower than the melting point of the first transparent resin substrate sheet.

Decorating Sheet:

First, the construction of the decorating sheet will be described.

[Transparent Resin Substrate Sheet]

Material: The material for the transparent resin substrate sheet 1 is selected from transparent thermoplastic resins with consideration for transparency, suitability for embossing, compatibility of suitability for forming, such as vacuum forming, that is conducted after thermally softening a decorating sheet with the endurance of an embossed pattern (prevention of flattening of an embossed pattern), and so forth.

Examples of thermoplastic resins useful herein include polyolefin resins such as polyethylene, polypropylene, polymethyl pentene, polybutene, and thermoplastic olefin elastomers; polyester resins such as polyethylene terephthalate, polybutylene terephthalate, polyethylene naphthalate, terephthalic acid-isophthalic acid-ethylene glycol copolymers, terephthalic acid-ethylene glycol-1,4-cyclohexane dimethanol copolymers, and thermoplastic polyester elastomers; polyamide resins such as nylon 6, nylon 9, and nylon 6,6; fluoroplastics such as polyvinyl fluoride, polyvinylidene fluoride, polyvinylidene trifluoride, ethylene-ethylene tetrafluoride copolymers, and polyethylene tetrafluoride; acrylic resins; polyvinyl chloride; polystyrene; and polycarbonate resins.

Examples of the above-described acrylic resins include polymethyl-(meth)acrylate, polyethyl(meth)acrylate, polybutyl(meth)acrylate, methyl(meth)acrylate-butyl(meth)acrylate copolymers, ethyl(meth)acrylate-butyl(meth)acrylate copolymers, and methyl(meth)acrylate-styrene copolymers ((meth)acrylate herein means acrylate or methacrylate). These resins are used either singly or as a mixture of two or more resins.

Thickness: The thickness of the transparent resin substrate sheet (the total thickness when the transparent resin substrate is a laminate) is approximately from 50 to 400 μm.

Additives: Proper additives may be incorporated in the transparent resin substrate sheet, as needed. A variety of additives may be added in a proper amount unless they impair transparency, surface gloss, and thermal properties such as melting point. Examples of additives useful herein include ultraviolet light absorbers such as benzotriazole or benzophenone ultraviolet light absorbers, photostabilizers such as hindered amine radical scavengers, lubricants such as silicone resins and waxes, coloring agents, plasticizers, thermal stabilizers, anti-fungus agents, anti-mold agents, and antistatic agents.

Lamination: The lamination of the transparent resin substrate sheet may be either a single layer or a laminate of two or more layers of different types of resins. In the case where the decorating sheet is subjected to vacuum forming, or to the thermoforming step that is effected in a mold in the course of in-injection-mold decorating or the like, the transparent resin substrate sheet 1 is required to fulfill, at the same time, the two contradictory requirements, the moldability (or the shape-follow-up properties) of the transparent resin substrate sheet itself, and the prevention of disappearance, from the surface of the transparent resin substrate sheet, of the high-gloss and low-gloss portions having fine irregularities.

Figure 3:
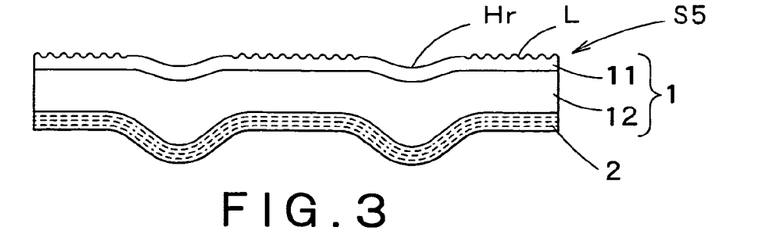
FIG. 3 is a sectional view illustrating another form of a decorating sheet according to the present invention.

It is possible to fulfill, at the same time, the two requirements, the moldability and the prevention of disappearance of the high-gloss portions and the low-gloss portions, by controlling the shaping or molding conditions, or by the selection of resin materials. The two requirements are most stably fulfilled at the same time when the transparent resin substrate sheet 1 is composed of two layers, a first transparent resin substrate sheet 11 situated on the surface side and a second transparent resin substrate sheet 12 situated on the back surface side, as shown in FIG. 3, and when a crystalline resin having a melting point and a non-crystalline resin having no melting point are used for the first transparent resin substrate sheet 11 and the second transparent resin substrate sheet 12, respectively. Moreover, the first transparent resin substrate sheet and the second transparent resin substrate sheet are made so that the melting point of the former is higher than the softening point of the latter. The softening points are herein indicated by VICAT softening points (provided by the standard DIN-ENTW. 53, 460).

In the case where the transparent resin substrate sheet 1 is composed of two layers having the above-specified physical properties relating to temperature, when embossing irregularities (protrusions/depressions) on the surface of the transparent resin substrate sheet 1, especially when embossing fine irregularities on the front surface of the heated transparent resin substrate sheet 1, the embossing temperature is made equal to or higher than the melting point of the first transparent resin substrate sheet. At such a temperature, the crystalline structure of the crystalline resin used for the first transparent resin substrate sheet 11 is broken, and the sheet is shaped to have irregularities; and when the temperature of the sheet has come down after the embossing step, the resin is recrystallized and the shape of the irregularities is thus fixed.

Moreover, when the decorating sheet is heated again in thermoforming, such as vacuum forming, in the course of in-injection-mold decorating, the crystalline structure is retained if the heating temperature is made lower than the melting point of the first transparent resin substrate sheet 11 and equal to or higher than the VICAT softening point of the second transparent resin substrate sheet 12. Therefore, it becomes easy to retain the shape of the fine irregularities while securing the moldability of the decorating sheet as a whole by the second transparent resin substrate sheet 12 made from a non-crystalline resin. Further, as for the protrusions/depressions on the back side of the second transparent resin substrate sheet 12, it is possible to retain these irregularities if the decorating sheet is placed on an adherend 5, while the adherend 5 is still in a fluid state, in such a manner that the irregularities get into the adherend 5 itself, or into an adhesive by which the decorating sheet is laminated to the adherend. For example, in the case where the decorating sheet is subjected to in-injection-mold decorating via the vacuum forming step, it is preformed by vacuum forming into the shape of a molded product to be produced. In this step, although the surface of the decorating sheet is pressed against the vacuum forming mold face, the back surface of the decorating sheet is free, so that the flattening of the protrusions/depressions present on the back surface is avoidable. In the subsequent injection molding step, the front surface of the decorating sheet is pressed against the injection mold face, while the protrusions/depressions on the back side of the decorating sheet are covered with an injection molding resin in a fluid state, so that these irregularities are retained in the resin molded product as they are.

The combination of the first transparent resin substrate sheet 11 and the second transparent resin substrate sheet 12 as described above is specifically as follows. When the preforming step in the in-injection-mold decorating method is effected by vacuum forming, since heat at a temperature between 100° C. and 170° C. is applied to the decorating sheet, an acrylic resin (in the case of polymethyl (meth) acrylate, the VICAT softening point is 120° C.), polycarbonate resin (VICAT softening point: 155° C.), polystyrene (VICAT softening point: 103° C.), or the like is used for the second transparent resin substrate sheet 12, and a fluoroplastic such as polyvinylidene fluoride (melting point: 160° C. or more), polyethylene tetrafluoride (melting point: 327° C.), or polyethylene trifluoride (melting point: 205-220° C.), for the first transparent resin substrate sheet 11. In this case, it is possible to select a combination of resins suitable for embossing that is conducted at a temperature equal to or higher than the melting point of the first transparent resin substrate sheet 11, and for vacuum forming that is conducted at a temperature lower than the melting point of the first transparent resin substrate sheet 11 and equal to or higher than the softening point of the second transparent resin substrate sheet 12.

As for the specific combination of resins for the above-described two layers, the first transparent resin substrate sheet 11 and the second transparent resin substrate sheet 12, one of the preferred combinations is a combination of a fluoroplastic (more specifically, vinylidene fluoride resin, for example) for the first transparent resin substrate sheet 11 and an acrylic resin for the second transparent resin substrate sheet 12. Of the fluoroplastics, vinylidene fluoride resin is preferred because it is not so costly and has a moderate melting point. On the other hand, acrylic resins are preferred for the second transparent resin substrate sheet because they have a tendency to make the temperature range suitable for thermoforming wider and also because they are excellent in weathering resistance and transparency.

In the vacuum forming (including vacuum-compression forming) of the decorating sheet, which is conducted in the course of in-injection-mold decorating in order to preform the decorating sheet, the decorating sheet is heated to a temperature of about 100 to 120° C. if it is subjected to in-line preforming, where the decorating sheet is vacuum-formed in an injection mold that serves also as a vacuum forming mold, and to a temperature of 140 to 170° C. if the decorating sheet is subjected to off-line preforming, where the decorating sheet is vacuum-formed in a mold different from an injection mold, that is, the decorating sheet is vacuum-formed in advance outside an injection-molding machine. From this point of view, it is preferable to select, for the first transparent resin substrate sheet, a resin having a melting point of 120° C. or more, preferably 130° C. or more, if only in-line preforming is taken into consideration, or a resin having a melting point of 150° C. or more, more preferably 170° C. or more, if off-line preforming is also taken into consideration.

The thickness of the transparent resin substrate sheet 11 may be determined according to the height of the fine irregularities that will be embossed on the surface of the transparent resin substrate sheet 11 in order to make the surface gloss lower. It is possible to make the other layers such as the second transparent resin substrate sheet 12 mainly contribute to the vacuum formability of the decorating sheet as a whole. Therefore, the thickness of the first transparent resin substrate sheet 11 is usually made smaller than that of the second transparent resin substrate sheet 12. A specific example of the thickness of the first transparent resin substrate sheet 11 is approximately from 5 to 50 µm.

On the other hand, the second transparent resin substrate sheet 12 ensures that the decorating sheet can have the required vacuum formability, and is useful in embossing protrusions/depressions on the back surface of the transparent resin substrate sheet. Moreover, the degree to which the second transparent resin substrate sheet 12 contributes to the total thickness of the decorating sheet is usually higher than that to which the first transparent resin substrate sheet 11 contributes to the total thickness. Therefore, a resin that is more excellent in vacuum formability than the resin for the first transparent resin substrate sheet 1 is used for the second transparent resin substrate sheet 12. For these reasons, the thickness of the second transparent resin substrate sheet 12 is usually made greater than that of the first transparent resin substrate sheet 11. A specific example of the thickness of the second transparent resin substrate sheet 12 is approximately from 50 to 200 µm. The combination of the thickness of the first transparent resin substrate sheet 11 and that of the second transparent resin substrate sheet 12 is not limited to the above-described one.

In laminating the first transparent resin substrate sheet 11 and the second transparent resin substrate sheet 12, the two sheets that have been prepared separately may be laminated by an adhesive. When productivity, cost, and so forth are taken into account, it is preferable to form the transparent resin substrate sheets 11, 12 by two-layer co-extrusion. Alternatively, the first transparent resin substrate sheet 11 and the second transparent resin substrate sheet 12 may be formed by preparing in advance a resin film for either one of the two substrate sheets, and applying, to this resin film, a resin for the other substrate sheet by hot-melt extrusion coating. Two-layer co-extrusion or hot-melt extrusion coating can make it possible to obtain a thin transparent resin substrate sheet that cannot be obtained when the first transparent resin substrate sheet 11 and the second transparent resin substrate sheet 12 are laminated. Two-layer co-extrusion is more advantageous in that it can make the first transparent resin substrate sheet 11 and the second transparent resin substrate sheet 12 firmly adhere to each other.

High-gloss portions and low-gloss portions: The front surface of the transparent resin substrate sheet 1 is divided into two types of portions different in gloss, high-gloss portions H and low-gloss portions L. Owing to the thickness of the transparent resin substrate sheet 1 at the high-gloss portions H and that at the low-gloss portions L, and to the irregularities (protrusions/depressions) on the back side of the light-reflective interface between the transparent resin substrate sheet 1 and the glossy layer 2, the decorating sheet provides a pattern that gives visually a three-dimensional sensation.

A pattern that the high-gloss portions H and the low-gloss portions L provide may be of any design that meets demand (since this pattern gives visually a three-dimensional sensation, it is herein referred to as a three-dimensional pattern). Examples of three-dimensional patterns include the grain and vessels of wood, the grain and growth rings of wood, the texture of sand, satin, hair lines, linear conduits, three-dimensional cleavage planes of granite, the texture of cloth, leather grain, joints between tiles or bricks, characters, and geometrical patterns.

In particular, the high-gloss portions H are made to correspond to the portions of the pattern that should be visually felt as if they were depressions, while the low-gloss portions L are made to correspond to the portions of the pattern that should be visually felt as if it were protrusions. There has so far been known a technique that makes use of differences in gloss in order to provide a pattern that can visually give a pseudo-three-dimensional sensation. This technique, however, is different from the present invention in construction because it makes use only of differences in gloss in order to make a pattern visually give a three-dimensional sensation, and never uses the visual interaction between the glossy layer on the back surface of the transparent resin substrate sheet and the difference in the thickness of the transparent resin substrate sheet. In the conventional technique, therefore, the high-gloss portions H correspond to protrudent portions of a pattern, while the low-gloss portions L correspond to depressed portions of the pattern, and this is quite contrary to the present invention.

A visually recognizable difference is herein enough for the difference in gloss between the high-gloss portions H and the low-gloss portions L. In general, this difference is made 5 or more, more preferably 20 or more, as indicated by the 60-degree specular gloss Gs (60°) according to JIS Z8741. By making fine irregularities, the low-gloss portions L are made to have rough surfaces as compared with the high-gloss portions H, while the high-gloss portions H are made to have smooth surfaces as compared with the low-gloss portions L. For example, the surface roughness of the transparent resin substrate sheet 1 at the high-gloss portions H is made so that the center line average height Ra according to JIS B0601 and the specular gloss Gs (60°) are less than 1 μm and 80 or more, respectively. On the other hand, the surface roughness of the transparent resin substrate sheet 1 at the low-gloss portions L is made so that the center line average height Ra and the specular gloss Gs (60°) are 4 μm or more and 40 or less, respectively.

By a conventional method such as embossing, it is possible to make, for varying the gloss, the above-described difference in roughness of the fine irregularities (rough surface).

Difference in thickness: The transparent resin substrate sheet 1 is formed so that its thickness is greater at the high-gloss portions H and smaller at the low-gloss portions L. The difference in thickness between the high-gloss portions H and the low-gloss portions L is usually about 10 to 100 μm. The interface between the transparent resin substrate sheet 1 and the glossy layer 2 (also referred to as a light-reflective interface) at the thick portions right under the high-gloss portions H is shaped so that it protrudes toward the back surface side to form protrusions p, as shown in FIGS. 1A to 1C. Preferably, at least the crosswise contour of the protrusion p curves concave relative to the back surface side. Examples of the concave curve herein useful include circles, ellipses, parabolas, hyperbolas, sine curves, ellipsoidal functional curves, Bessel's functional curves, and cycloids, and curves that are approximations of these curves. The longitudinal section of the protrusion p may be in a shape that curves concave relative to the back surface side, or in other shapes such as a shape consisting of straight lines, protruding toward the back surface side. If the above-described light-reflective interface is formed so that it has protrusions in the above-described shape, protruding toward the back surface side, it functions as a concave mirror; after once focusing illumination light on the focal point (focal line), the interface diffuses the focused light. For this reason, the protrusions p are brightly seen, with their depth and shape more stressed. In addition, since the illumination light obliquely entering the protrusions p casts shadows on the side faces of the protrusions p, there can also be obtained the effect that the contours of the protrusions are accentuated (edge enhancement effect). Further, since the high-gloss portions H are made right above the protrusions, and the low-gloss portions L are made around the high-gloss portions H, there can be further obtained the effect that the protrusions (the depressions when viewed from the surface side) are seen with their depth and shape stressed as compared with the portions around the protrusions. Consequently, even when the surface of the transparent resin substrate sheet 1 is flat or slightly protrudent, it can fully give visually a three-dimensional sensation.

Method for making the high-gloss/low-gloss portions and the protrusions on the back surface: A conventional shaping method such as embossing may be employed to shape the transparent resin substrate sheet 1 so that the sheet has, on its front surface, the high-gloss portions H and low-gloss portions L as described above, and, on its back surface, the protrusions p in the positions corresponding to the high-gloss portions. In the case where a laminate of two layers, a first transparent resin substrate sheet 11 made from a crystalline resin and a second transparent resin substrate sheet 12 made from a non-crystalline resin, the melting point of the first transparent resin substrate sheet being higher than the softening point of the second transparent resin substrate sheet, is used for the transparent resin substrate sheet, the embossing of the first transparent resin substrate sheet 11 is conducted at a temperature equal to or higher than the melting point of the second transparent resin substrate sheet 12. At such a temperature, the two transparent resin substrate sheets become fluid. In order to conduct embossing under such conditions, it is possible to employ the following processing method (A) or (B), for example. On the other hand, in order to conduct embossing by heating the first transparent resin substrate sheet 11 to a temperature equal to or higher than its melting point, and the second transparent resin substrate sheet 12 to a temperature lower than its melting point, the following processing method (C) may be employed, for example. These embossing methods themselves and the machines themselves for use in these methods are conventional ones.

(A) Each of the two transparent resin substrate sheets 11, 12 is cut into sheets, and these sheets are embossed by a thermal sheet-pressing machine.

(B) The two transparent resin substrate sheets 11, 12 are prepared in the form of continuous belt-like sheets, and these sheets are placed between an embossing plate in the form of an endless belt and an impression drum in the form of an endless belt and are pressed; the two endless belts are made to run at a speed synchronized with the sheet running speed, thereby embossing the two transparent resin substrate sheets in a fluid state without exerting substantially no tension to them.

(C) The two transparent resin substrate sheets 11, 12 are prepared in the form of continuous belt-like sheets, and a laminate of these sheets is embossed by the use of a rotary-type embossing machine. In this process, embossing is conducted by heating the second transparent resin substrate sheet 12 with heat conducted from a heating drum to a temperature lower than its melting point, and locally heating, by an infrared radiant heater, only the vicinity of the surface of the first transparent resin substrate sheet 11 to a temperature equal to or higher than its melting point.

A preferred method for making the above-described two-layered transparent resin substrate sheet will be described with reference to FIGS. 5A and 5B.

First, a first transparent resin substrate sheet 11, a second transparent resin substrate sheet 12, and a glossy layer 2 that are flat and uniform in thickness are prepared. In FIGS. 5A and 5B, the first transparent resin substrate sheet 11 on the surface side and the second transparent resin substrate sheet 12 on the back surface side have been laminated in advance, and the glossy layer 2 has also previously been laminated to the back surface of the second transparent resin substrate sheet 12 by a printing method or the like. Alternatively, these three layers may be prepared separately and laminated at the time when they are embossed. The first transparent resin substrate sheet 11 is made from a crystalline resin; the second transparent resin substrate sheet 12 is made from a non-crystalline resin; and the melting point of the first transparent resin substrate sheet 11 is higher than the softening point of the second transparent resin substrate sheet 12.

Figure 5A:
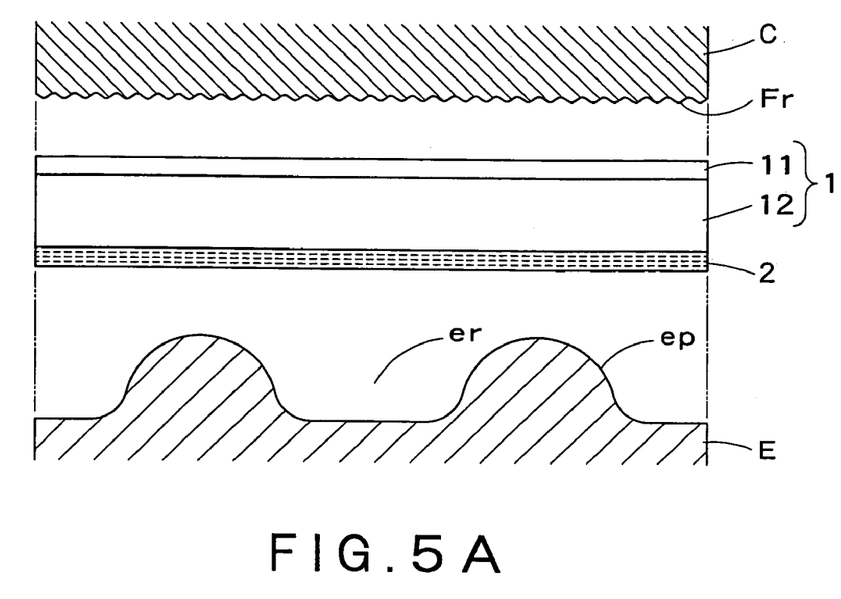

Subsequently, the first transparent resin substrate sheet 11, the second transparent resin substrate sheet 12, and the glossy layer 2 are placed between a rubber impression drum C and a metallic embossing plate E, as shown in FIG. 5A. The rubber impression drum C has a rough surface Fr that corresponds to the rough surface the first transparent resin substrate sheet 11 should have. As long as the surface of the rubber impression drum C is made from rubber such as silicone rubber, the center part of the drum may be a rigid core made of iron or the like. The metallic embossing plate E is made from a metal such as iron or copper, and has a surface with protrusions/depressions that correspond to the depressions/protrusions the second transparent resin substrate sheet 12 should have on its back surface. The rubber impression drum C and the metallic embossing plate E may be in the form of either a flat plate or a cylinder.

The first transparent resin substrate sheet 11, the second transparent resin substrate sheet 12, and the glossy layer 2 are softened by heating, and are pressed by the rubber impression drum C and the metallic embossing plate E, with the surface of the first transparent resin substrate sheet 11 in contact with the rubber impression drum C, and with the back surface of the glossy layer 2 in contact with the metallic embossing plate E, as shown in FIG. 5A (so-called embossing). When heating the substrate sheets, the first transparent resin substrate sheet 11 is heated from the surface side by an infrared radiant heater (not shown in the figure), thereby heating the vicinity of the surface of the first transparent resin substrate sheet 11 to a temperature equal to or higher than its melting point. On the other hand, the second transparent resin substrate sheet 12 is heated with heat conducted from a heating drum (not shown in the figure) to a temperature equal to or higher than its softening point but lower than its melting point.

Figure 5B:
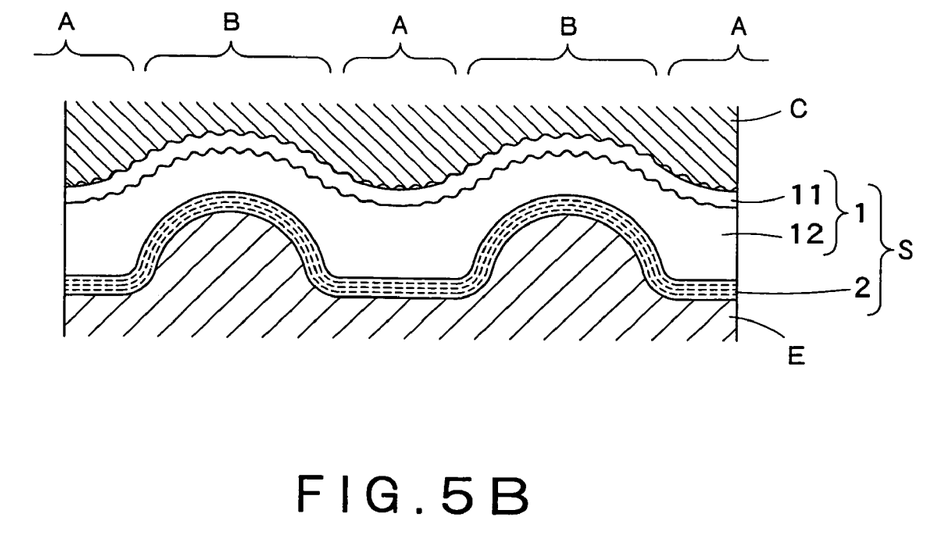

In the embossing step, the three layers are strongly pressed at the high-embossing-pressure portions B by the protrusions ep on the metallic embossing plate E, and the two transparent resin substrate sheets 11, 12 thus become relatively thin, as shown in FIG. 5B. At the same time, the surface of the first transparent resin substrate sheet 11 is securely roughened by the rough surface Fr of the rubber impression plate C; these rough portions of the surface of the first transparent resin substrate sheet 11 serve as the low-gloss portions L. On the other hand, the three layers are weakly pressed at the low-embossing-pressure portions A by the recesses er in the metallic embossing plate E, so that the two transparent resin substrate sheets 11, 12 become relatively thick. At the same time, the surface of the first transparent resin substrate sheet 11 is loosely roughened by the rough surface Fr of the rubber impression plate C; these rough portions of the surface of the first transparent resin substrate sheet 11 serve as the high-gloss portions H. Either before or after cooling the three layers, the pressure on the rubber impression drum C and the metallic embossing plate E is released. Thus, there is obtained a decorating sheet S5 of the present invention shown in FIG. 3, having the laminated, shaped three layers.

[Glossy Layer]

The glossy layer 2 is formed on (laminated to) the back surface of the transparent resin substrate sheet 1. A conventional material and method may be used to form the glossy layer. For example, the glossy layer is made of a layer of glossy ink prepared by dispersing a glitter in a transparent binder, or a metallic thin film layer. Examples of resins useful for the binder of the glossy ink layer include acrylic resins, vinyl chloride-vinyl acetate copolymers, chlorinated polypropylene, polyester resins, and polyurethane resins. Examples of the glitter useful herein include metallic pigments such as powder or scales of metals including aluminum and brass, and pearlescent pigments such as powder or scales of titanium-dioxide-coated mica. The glossy ink layer may be formed by a coating method such as roll, comma, slit reverse, or curtain flow coating, or by solid-color printing that is effected by gravure or silk screen printing. In addition to the glitter, a coloring agent such as a color pigment may be added in order to make the glossy layer color metallic. The thickness of the glossy ink layer is usually about 1 to 50 μm. On the other hand, a metallic thin film layer may be formed by vacuum deposition, plating, or electroless plating, using a metal such as aluminum, chromium, tin, or indium. The glossy layer may be made color metallic by adding a coloring agent to the transparent resin substrate sheet 1, or forming a colored transparent ink layer between the transparent resin substrate sheet 1 and the metallic thin film layer. The thickness of the metallic thin film layer is usually about 0.1 to 1 μm.

[Decorative Layer]

The decorative layer 3 is an optional layer that is formed in order to obtain a decorating sheet having a more elaborate design. The decorative layer is formed either partially or by using a transparent material such as transparent color ink so as not to mar the brightness of the glossy layer 2 or the three-dimensional sensation that is brought by the brightness of the glossy layer. Ink selected from conventional ones may be used to form the decorative layer 3. Examples of resins useful for the binder of the ink include acrylic resins, vinyl chloride-vinyl acetate copolymers, chlorinated polypropylene, polyester resins, and polyurethane resins. Examples of coloring agents for use in the ink include inorganic pigments such as titanium white, zinc oxide, carbon black, iron black, blood red, cadmium red, ultramarine, cobalt blue, chrome yellow, and titanium yellow; organic pigments such as phthalocyanine blue, indanthrene blue, isoindolinone yellow, quinacridone red, and perylene red; and dyes. Examples of patterns to be formed on the decorative layer 3 include wood grain patterns, stone grain patterns, sand texture patterns, cloth texture patterns, leather grain patterns, tile-like patterns, brick-like patterns, geometrical patterns, characters, symbols, or solid-color patterns. Although the decorative layer is for showing a pattern such as a wood grain pattern, it may also serve as a functional layer such as a magnetic layer or an electrically conductive layer. In other words, decorating or decoration herein also means that a product is made to have the function as described above.

[Backing Sheet]

The backing sheet 4 is optionally formed for the main purpose of adjusting (securing) the total thickness of the decorating sheet. The backing sheet 4 may be formed also for the purpose of increasing the adhesion to an adherend. Such a backing sheet 4 may be a thermoplastic resin sheet, and it is laminated to the back surface of the glossy layer. Depending on the material for the adherend, etc., a resin suitable for the thermoplastic resin sheet is selected from a variety of polyolefin resins such as polypropylene, chlorinated polyolefin resins, ABS resins, and resin mixtures of different types of resins such as mixtures of polyolefin resins and ABS resins. In particular, in the case where the decorating sheet is subjected to vacuum forming, it is preferable to make the backing sheet 4 by the use of the same resin as is used for the transparent resin substrate sheet, or for the second transparent resin substrate sheet if the transparent resin substrate sheet is a laminate of two layers, in order not to impair the moldability of the decorating sheet.

To laminate the backing sheet 4, it is proper to laminate a thermoplastic resin sheet prepared in advance to the glossy layer 2 by a conventional adhesive made from a urethane resin or the like by a conventional laminating method such as dry laminating. Specifically, for example, a thermoplastic resin sheet is laminated, by an adhesive, to the glossy layer 2 face of the laminate of the transparent resin substrate sheet 1 and the glossy layer 2. Formation and lamination of the thermoplastic resin sheet, the backing sheet 4, may also be conducted simultaneously by hot-melt extrusion coating of the thermoplastic resin. The thickness of the backing sheet 4 varies depending on the purpose for which the backing sheet 4 is used, including securing of the total thickness of the decorating sheet, and improvement in adhesion to an adherend. However, for the purpose of securing the total thickness of the decorating sheet, the thickness of the backing sheet 4 is usually made about 20 to 500 μm.

Further, the backing sheet 4 may have the function of increasing the opacifying power of hiding an adherend. Namely, when the glossy layer 2 is a thin film and is poor in the opacifying power, or when the glossy layer 2 is partially stretched to be thin or is cracked in the course of the formation of the decorating sheet, the opacifying power can deteriorate. The backing sheet 4 can make up for this deterioration of the opacifying power. In order to give the opacifying power to the backing sheet 4, a highly opacifying pigment may be added to the thermoplastic resin for the backing sheet 4. Examples of the highly opacifying pigment include titanium white and carbon black (Japan ink). In this case, any other proper pigment may also be added, as needed.

Whether the backing sheet 4 is present or not, a conventional adhesive layer may be optionally formed on the outermost back surface of the decorating sheet. Examples of resins useful for the adhesive layer include acrylic resins, vinyl chloride-vinyl acetate copolymers, chlorinated polyolefin resins, urethane resins, and rubber resins.

[Adherend to which Decorating Sheet is Laminated]

The decorating sheet of the present invention can be laminated to any of a variety of adherends 5 for decorating. For example, the adherend may be of any material and in any shape. Examples of the material for the adherend include resins, wood, metals, non-metallic inorganic materials, paper, and cloth. Further, the adherend may be in any shape, and it may be in the shape of a sheet (or a film), a plate, or a three-dimensional object, for example.

Decorated Molded Product:

A decorated molded product of the present invention comprises a resin molded product 5, as an adherend, and a decorating sheet S that has been laminated to the surface of the resin molded product 5 in such a manner that a transparent resin substrate sheet 1 in the decorating sheet S is situated on the front surface side. The decorating sheet S has a transparent resin substrate sheet 1 having protrusions on the back side in the positions corresponding to the high-gloss portions, protruding toward the back surface side, and the front surfaces of the high-gloss portions are flat, or concave relative to the front surface side.

Although the above-described decorating sheet may be laminated to any adherend, resin molded products are preferred for the adherend because the decorating sheet S can fully show its effect when it is laminated to a resin molded product. The preferred method for laminating a decorating sheet to an adherend is so-called in-injection-mold decorating that a decorating sheet is preformed by vacuum forming into the desired shape of a molded product to be produced, and is then integrally laminated to the surface of a resin molded product in an injection mold. In this case, although the decorating sheet of the present invention has a flat or approximately flat front surface, it can provide a pattern that visually gives a three-dimensional sensation. For this reason, this pattern does not disappear, because a pattern actually is not flattened, in the vacuum forming or injection molding step, and the molded product decorated with the decorating sheet can thus have a pattern that is visually sensed as if it were a three-dimensional pattern.

A decorating sheet obtained in the following manner is highly effective: a laminate of two layers, a first transparent resin substrate sheet 11 to be situated on the front surface side and a second transparent resin substrate sheet 12 to be situated on the back surface side is used for the transparent resin substrate sheet 1; a crystalline resin is used for the first transparent resin substrate sheet 11; a non-crystalline resin is used for the second transparent resin substrate sheet 12; and the first transparent resin substrate sheet 11 and the second transparent resin substrate sheet 12 are made so that the melting point of the former is higher than the softening point of the latter.

An example of the decorated molded product Pd composed of a resin molded product 5, as an adherend, and the decorating sheet S of the invention as described above, laminated to the surface of the resin molded product 5, is shown in FIG. 4A, a partially cutaway sectional view, and in FIG. 4B, a partially enlarged view of FIG. 4A. A typical method of producing such a decorated molded product is in-injection-mold decorating.

In FIG. 4B, the transparent resin substrate sheet 1 is a laminate of two layers, the first transparent resin substrate sheet 11 and the second transparent resin substrate sheet 12. The decorated molded product Pd is a three-dimensional object having either a non-flat front surface such as a rough surface, or a flat front surface. The decorated molded product may be in any shape, for example, in the shape of a plate (a flat plate, a curved plate, etc.), a column, or a three-dimensional object.

For the injection molding resin to be molded into the resin molded product 5, basically any resin selected from conventional ones can be used, and the resin selection may be made with consideration for the physical properties required for the molded product, cost, and so forth. Examples of resins useful herein include thermoplastic resins such as ABS (acrylonitrile-butadiene-styrene copolymer) resins, styrene resins, acrylic resins, vinyl chloride resins, polycarbonate resins, and polyolefin resins; and curable resins such as two-part curable resins, for example, uncured liquefied-urethane, unsaturated polyester, or epoxy resins. When a thermoplastic resin is used, the resin is thermally melted to be fluid and is then subjected to injection molding. When a curable resin is used, the resin (not yet cured) that is fluid at room temperature or has been thermally melted to be fluid is subjected to injection molding. A variety of conventional additives such as coloring agents, fillers, stabilizers, and lubricants are incorporated in the injection molding resin, as needed.

In-Injection-Mold Decorating Method:

The in-injection-mold decorating method according to the present invention comprises the sheet-making step of making a decorating sheet, and, preferably, the vacuum forming step of preforming the decorating sheet. The in-injection-mold decorating method will be described hereinafter, beginning from the explanation of the sheet-making step, followed by the explanation of the vacuum forming step and that of the injection molding step.

[Sheet-Making Step]

The sheet-making step is the step of making the above-described decorating sheet.

Therefore, for the sheet-making step of the present invention, the constituent layers of the decorating sheet, the composition, melting point, and softening point of the resin for each constituent layer, the embossing temperature, and so forth are specified. Namely, in the sheet-making step, a laminate to be made into a decorating sheet, composed at least of a transparent resin substrate sheet 1, which will be the outermost layer of the finally produced decorated molded product, and a glossy layer 2, is heated. Thereafter, a decorating sheet S is obtained by embossing the laminate so that the transparent resin substrate sheet 1 has, on its front surface, high-gloss portions and low-gloss portions, and, at the same time, that the thickness of the transparent resin substrate sheet 1 at the high-gloss portions is different from that at the low-gloss portions. In this process, it is more preferable to use, for the transparent resin substrate sheet 1, a laminate of two layers, a first transparent resin substrate sheet 11 to be situated on the front surface side and a second transparent resin substrate sheet 12 to be situated on the back surface side; it is convenient to use such a transparent resin substrate sheet 1 in the specified, subsequent vacuum forming step. In this case, a crystalline resin is used for the first transparent resin substrate sheet 11; a non-crystalline resin is used for the second transparent resin substrate sheet 12; and the first transparent resin substrate sheet 11 and the second transparent resin substrate sheet 12 are made so that the melting point of the former is higher than the softening point of the latter. A preferred specific example of the decorating sheet is, as mentioned previously, that the first transparent resin substrate sheet 11 and the second transparent resin substrate sheet 12 contain vinylidene fluoride resin and an acrylic resin, respectively.

[Vacuum Forming Step]

In the present invention, the decorating sheet S described above is used in in-injection-mold decorating after subjecting it to preforming. If the decorating sheet has the transparent resin substrate sheet 1 composed of the above-specified two layers, the sheet heating temperature in the vacuum forming step that is effected in order to preform the decorating sheet is made preferably equal to or higher than the softening point of the second transparent resin substrate sheet 12 and lower than the melting point of the first transparent resin substrate sheet 11. Such a sheet heating temperature ensures that the decorating sheet will be satisfactorily formed by vacuum forming that is conducted in order to preform the decorating sheet, and that the protrusions and depressions that the decorating sheet has will remain as they are even after the vacuum forming of the decorating sheet.

Vacuum forming (including vacuum-compression forming) that is conducted in order to preform the decorating sheet is roughly classified into two types: in-line preforming in which vacuum forming is conducted in an injection mold that also serves as a vacuum forming mold, and off-line preforming in which vacuum forming is conducted outside an injection molding system by using a vacuum forming mold that is different from an injection mold. Off-line preforming is usually more suitable than in-line preforming for the production of a large-sized decorated molded product, or for the preforming of a thick decorating sheet.

The sheet heating temperature at the time of vacuum forming is usually about 100 to 120° C. in in-line preforming, and about 140 to 170° C. in off-line preforming. Therefore, for example, when the decorating sheet having the transparent resin substrate sheet 1 composed of the two specified layers is used, if the first transparent resin substrate sheet 11 is made from vinylidene fluoride resin and the second transparent resin substrate sheet 12 is made from an acrylic resin, such a decorating sheet is applicable to both in-line preforming and off-line preforming. The above-described preforming temperatures are the usual ones, and the decorating sheet may be preformed also at a temperature not in the above-described range, depending on the resins used for making the decorating sheet.

[Injection Molding Step]

In the injection molding step, the decorating sheet that has been preformed in the above-described vacuum preforming step is placed in an injection mold, and a pair of male and female molds of the injection mold are clamped. Thereafter, a resin in a fluid state is poured into the cavity of the injection mold to fill up the cavity and is then solidified, thereby integrating the decorating sheet into the surface of the resin molded product. After solidifying the resin, the mold is opened, and the objective decorated molded product is taken out of the mold. Owing to the above-described decorating sheet, the decorated molded product has a pattern that is visually sensed as if it were a three-dimensional pattern.

Usually, the injection molding resin to be poured into the injection mold is thermally melted to be fluid, and, in this process, the temperature of the resin can reach 200° C. or more. Even when the injection molding resin has such a high temperature, the protrusions/depressions that the decorating sheet has remain as they are. In other words, the heat of the injection molding resin at the time of injection molding has no influence on the decorating sheet unlike the heat applied at the time of vacuum forming. For example, when ABS resin is used for the injection molding resin, although the decorating sheet is placed under such temperature conditions that the temperature of the injection molding resin is approximately 200 to 240° C. and that the temperature of the injection mold is approximately 60° C., it is heated only momentarily, and the protrusions/depressions that the decorating sheet has remain basically as they are on the decorated molded product as long as they can withstand the vacuum forming step.

[Others]

A so-called in-injection-mold decorating method will now be outlined below with reference to FIGS. 6A to 6C, explanatory views. The preforming that is conducted in the following decorating method is of in-line type that the vacuum forming step is effected in an injection mold.

Figure 6A:
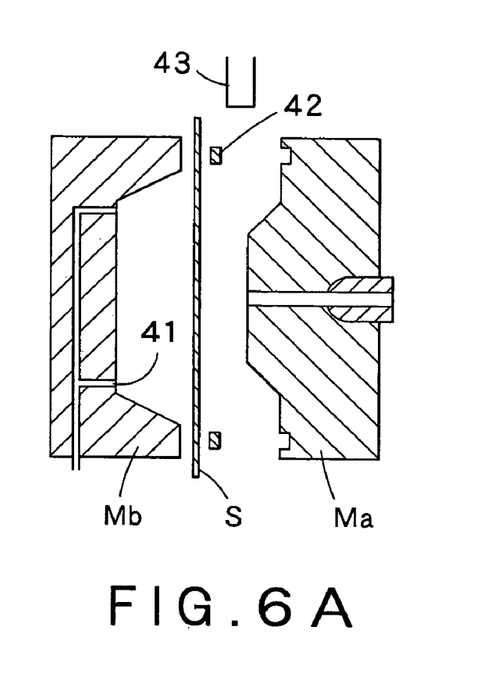
FIGS. 6A to 6C are explanatory views explaining an in-injection-mold decorating method according to the present invention.

A pair of molds, a mold Ma having a runner and a gate that communicate with an injection nozzle, and a mold Mb having a vacuum port 41 on the cavity wall, serving also as a preforming mold useful for vacuum forming the decorating sheet, as shown in FIG. 6A, are used for the injection mold. These molds are made from a metal such as iron, or ceramics. The decorating sheet S is placed between the two molds Ma, Mb that are open, and is fixed to the mold Mb by a sheet clamp 42 having a frame-like planar structure, where the back surface side (relative to the transparent resin substrate sheet) of the glossy layer in the decorating sheet is directed to the injection molding resin side, the right-hand side in the figure.

Figure 6B:
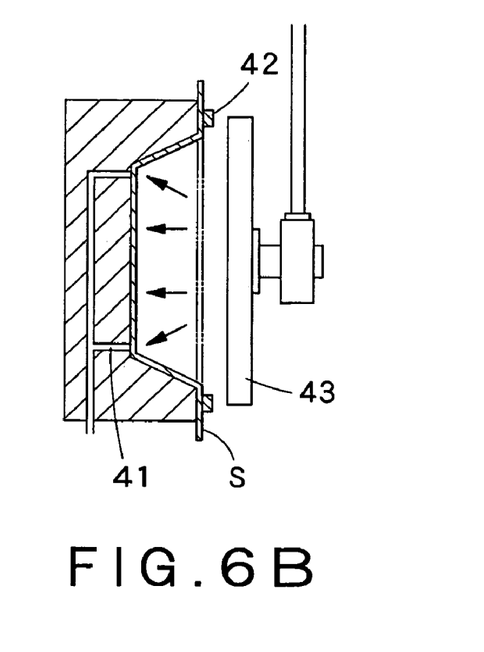

Subsequently, as shown in FIG. 6B, a heater 43 standing by at the outside of the frame (at above the frame in the figure) is moved and inserted between the two molds to thermally soften the decorating sheet. Although this heating step includes radiation non-contact heating, conductive contact heating is also useful. The decorating sheet S is sucked into the mold Mb by drawing a vacuum through the vacuum port 41, thereby preforming the decorating sheet S along the cavity wall of the mold Mb.

Figure 6C:
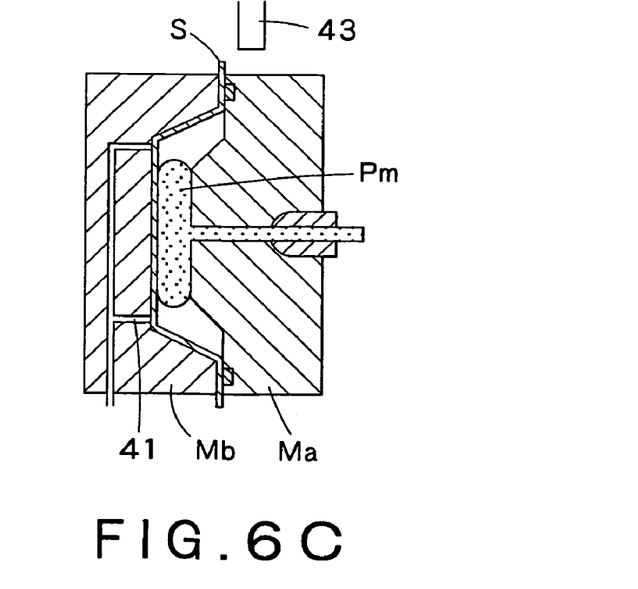

Thereafter, the heater 43 is moved away from between the two molds, and the molds are clamped as shown in FIG. 6C. The cavity created by the two molds is filled with a fluid resin Pm, for example, in the state of being thermally melted. After solidifying the resin by cooling or the like, the molds are opened, and the molded product is taken out of the molds. Unnecessary portions are then trimmed from the decorating sheet. Thus, there is finally obtained a decorated molded product Pd that the decorating sheet S has been laminated to the resin molded product 5 for decorating, as shown in FIGS. 4A and 4B. In the present invention, owing to the decorating sheet, even the decorated molded product can provide a pattern that is visually sensed as if it were a three-dimensional pattern.

EXAMPLE

Example 1

The decorating sheet S5 shown in FIG. 3 was made in the following manner. First, vinylidene fluoride resin (melting point Tm 160° C.), a crystalline fluoroplastic, and an acrylic resin (VICAT softening point Ts 118° C.), a non-crystalline resin, were co-extruded in order to obtain a transparent resin substrate sheet 1 composed of a laminate of a first transparent resin substrate sheet 11 with a thickness of 8 μm and a second transparent resin substrate sheet 12 with a thickness of 72 μm.

Next, silver ink prepared by adding aluminum scaly foil (mean particle diameter 14 μm), a glitter, to an acrylic binder resin was applied to the second-transparent-resin-substrate-sheet 12-side face of the above-described transparent resin substrate sheet 1 by gravure printing to form a glossy layer 2 with a thickness of 2 μm (when dried). Further, ink that was a 1:1 (weight ratio) resin mixture consisting of an acrylic resin and a vinyl chloride-vinyl acetate copolymer was then applied to the glossy layer two times by gravure printing to form an adhesive layer (not shown in the figure) with a thickness of 4 μm (when dried). There was thus obtained a decorating sheet.

Thereafter, the surface of the first transparent resin substrate sheet 11 made from the vinylidene fluoride resin was embossed to have low-gloss portions L that were flat when viewed from the surface side but had rough surfaces with fine irregularities with a center line average height Ra of 5 μm, and high-gloss portions Hr that were concave when viewed from the surface side and had smooth surfaces with a center line average height Ra of 0.1 μm, as shown in FIGS. 5A and 5B. The depth of the concave portions was 10 μm. The low-gloss portions L and the high-gloss portions H were in the form of thin stripes with a width of 100 to 200 μm, and these two types of portions were alternately arranged to form a pattern of hair lines, as a whole. On the other hand, the second transparent resin substrate sheet 12 made from the acrylic resin and the glossy layer 2 were embossed to have depressions in the positions corresponding to the low-gloss portions-L and protrusions P in the positions corresponding to the high-gloss portions H. The difference in level between the depressions and the protrusions was 80 μm. In the embossing step, the surface temperature of the first transparent resin substrate sheet 11 was raised to 180° C. by heat from an infrared radiant heater, and the second transparent resin substrate sheet 12 was heated by conductive heat from a heating metallic drum with a surface temperature of 150° C.

Next, the decorating sheet S was placed in an in-injection-mold decorating machine, with the glossy layer 2 side facing the gate side of the male mold of the injection mold. Subsequently, the decorating sheet S was softened by subjecting it to non-contact heating in which the sheet was heated by a heater to a temperature of 120° C. on the female mold of the injection mold serving also as a vacuum forming mold. The softened decorating sheet was vacuum-formed into the shape of the injection mold by evacuating the injection mold to produce a vacuum. The vacuum-formed decorating sheet was observed, and it was confirmed that the protrusion/depressions and the fine irregularities were still remaining as they were on the decorating sheet.

Thereafter, the injection mold was clamped, and AMS resin was injection-molded. This injection molding was conducted under the following conditions: the temperature of the injection mold was 60° C., and the temperature of the injection molding resin was 240° C. After opening the mold, the decorated molded product Pd was taken out of the mold and was observed. It was confirmed that the protrusions/depressions and the fine irregularities were remaining as they were on the surface of the decorated molded product Pd, and that the decorated molded product provided a pattern of an elaborate design that gave visually a three-dimensional sensation.

The invention claimed is:
1. A decorating sheet comprising:
   a transparent resin substrate sheet, and
   a glossy layer formed on the back surface of the transparent resin substrate sheet,
   the front surface of the transparent resin substrate sheet being divided into high-gloss portions with relatively high gloss and low-gloss portions with relatively low gloss, the thickness of the transparent resin substrate sheet being relatively great at the high-gloss portions and relatively small at the low-gloss portions, the back surface of the transparent resin substrate sheet and the decorating sheet having protrusions protruding toward the back surface direction, the protrusions protruding in positions corresponding to the high-gloss portions, so that the decorating sheet provides a pattern that is visually sensed as if it were a three-dimensional pattern with protrusions and depressions that correspond to the thickness of the transparent resin substrate sheet on the high-gloss portions and that on the low-gloss portions.

2. The decorating sheet according to claim 1, further comprising, a decorative layer that does not fully opacify the glossy layer between the transparent resin substrate sheet and the glossy layer.

3. The decorating sheet according to claim 1, further comprising, a backing sheet made from a thermoplastic resin provided on the back surface of the glossy layer.

4. The decorating sheet according to claim 1, wherein the transparent resin substrate sheet is composed of a first transparent resin substrate sheet on the front surface of the decorating sheet and a second transparent resin substrate sheet being a portion of the transparent resin substrate sheet adjacent to the glossy layer, the first transparent resin substrate sheet is made from a crystalline resin, the second transparent resin substrate sheet is made from a non-crystalline resin, and the melting point of the first transparent resin substrate sheet is higher than the softening point of the second transparent resin substrate sheet.

5. A decorated molded product comprising:

a decorating sheet, and a resin molded product produced on the back surface of the decorating sheet, the decorating sheet comprising:

a transparent resin substrate sheet, and a glossy layer formed on the back surface of the transparent resin substrate sheet, the front surface of the transparent resin substrate sheet being divided into high-gloss portions with relatively high gloss and low-gloss portions with relatively low gloss, the thickness of the transparent resin substrate sheet being relatively great at the high-gloss portions and relatively small at the low-gloss portions, the back surface of the transparent resin substrate sheet and the decorating sheet having protrusions protruding toward the back surface direction, the protrusions protruding in positions corresponding to the high-gloss portions, so that the decorating sheet provides a pattern that is visually sensed as if it were a three-dimensional pattern with protrusions and depressions that correspond to the thickness of the transparent resin substrate sheet on the high-gloss portions and that on the low-gloss portions.

6. The decorated molded product according to claim 5, wherein the high-gloss portions are flat.

7. The decorated molded product according to claim 5, wherein the high-gloss portions are convex.

8. An in-injection-mold decorating method for producing a decorated molded product, in which when a resin is molded into a molded product, a decorating sheet is integrally laminated to the surface of the molded product, the method comprising:

heating and embossing a laminate of a transparent resin substrate sheet and a glossy layer formed on the back surface of the transparent resin substrate sheet so that the transparent resin substrate sheet has high-gloss portions with relatively high gloss and low-gloss portions with relatively low gloss on the front surface, and the transparent resin substrate sheet is relatively thick at the high-gloss portions and relatively thin at the low-gloss portions, thereby making a decorating sheet, softening the decorating sheet by heating, vacuum-forming the decorating sheet into a desired shape that corresponds to a shape of a decorated molded product to be finally produced, and placing the vacuum-formed decorating sheet in an injection mold, with the front surface of the decorating sheet facing the inner face of the injection mold, and pouring a resin into this injection mold and hardening the resin, thereby molding the resin into a resin molded product, and, at the same time, integrally laminating the decorating sheet to the surface of the resin molded product, wherein, a back surface of the transparent resin substrate sheet and the decorating sheet having protrusions protruding toward the back surface direction, the protrusions protruding in positions corresponding to the high-gloss portions, so that the decorating sheet provides a pattern that is visually sensed as if it were a three-dimensional pattern with protrusions and depressions that correspond to the thickness of the transparent resin substrate sheet on the high-gloss portions and that on the low-gloss portions.

9. The in-injection-mold decorating method according to claim 8, wherein the transparent resin substrate sheet in the laminate has a first transparent resin substrate sheet on the front surface and a second transparent resin substrate sheet being a portion of the transparent resin substrate sheet adjacent to the glossy layer, the first transparent resin substrate sheet is made from a crystalline resin, the second transparent resin substrate sheet is made from a non-crystalline resin, and the melting point of the first transparent resin substrate sheet is higher than the softening point of the second transparent resin substrate sheet.

10. The in-injection-mold decorating method according to claim 9, wherein, embossing is carried out at a temperature equal to or higher than the melting point of the first transparent resin substrate sheet.

11. The in-injection-mold decorating method according to claim 9, wherein, vacuum forming is carried out at a temperature equal to or higher than the softening point of the second transparent resin substrate sheet and lower than the melting point of the first transparent resin substrate sheet.

* * * * *